United States Patent Office 3,559,292
Patented Feb. 2, 1971

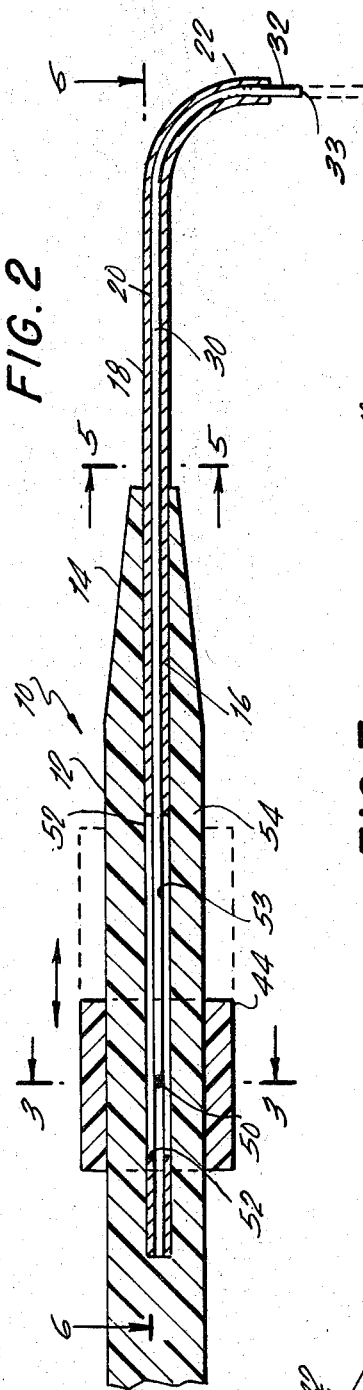

3,559,292
DENTAL GAUGE
Bernard Weissman, 304 Ashland Place,
Brooklyn, N.Y. 11217
Filed July 16, 1968, Ser. No. 745,320
Int. Cl. G01b 3/28
U.S. Cl. 33—169                                       1 Claim

ABSTRACT OF THE DISCLOSURE

A dental gauge comprising an elongated body member within which is contained a tubular member, a minor portion of the tubular member being disposed within the body member and a major portion of the tubular member extending externally thereof and terminating in a curved end, a probing member having a probing tip is positioned within the tubular member. The body member is provided with a graduated linear measuring scale and a sliding member is slidably disposed over the body member and secured to said probing member internally of said body member whereby the sliding member is operative to slide over the measuring scale in conjunction with the movement of the probe so that the measurement of the probe is directly readable on the measuring scale in dependence on the position of the sliding member.

BACKGROUND OF THE INVENTION (1) Field of the invention

This invention relates generally to dental instruments and, more particularly, to a gauge for measuring the depth of a hole drilled into a tooth or related object.

(2) Description of the prior art

In the practice of dentistry it is frequently necessary to drill a hole into a natural tooth in the mouth or into an artificial denture. For example, in the splinting of teeth it is required to drill holes into the natural teeth, cast models thereof and into the splints themselves. Similarly, in providing artificial crowns on natural teeth holes are required to be drilled into the tooth support, so that a "peg" may be inserted therein upon which the crown is installed, the crown having an associated hole drilled therein. In order to provide this precision dental work, it also frequently is necessary to accurately measure the hole provided in the tooth or artificial denture so that a suitably sized "peg" or securing pin, or the like may be accommodatingly inserted therein.

It would, therefore, be of tremendous advantage to provide a dental gauge which would measure the depth of a drilled hole, to any desired accuracy, and yet be of relatively simple construction.

SUMMARY OF THE INVENTION

It is, therefore, among one of the principal objectives of the invention to provide such a dental gauge, as aforementioned.

In accordance with the present invention a dental gauge is provided which is adapted to probingly measure a hole in a tooth or related structure. The novel dental gauge comprises a generally elongated member within which is embedded a tubular member, said tubular member, in turn, at least partially sheathing a probing member contained therein which probing member is adapted to simultaneously relay the depth of the hole to be measured in any desired graduation.

BRIEF DESCRIPTION OF THE DRAWING

The invention will be hereinafter described with reference to the accompanying drawing, in which:

FIG. 1 is a view in perspective of the invention dental gauge;
FIG. 2 is a side sectional view of the invention device;
FIG. 3 is a view taken along line 3—3 of FIG. 2;
FIG. 4 is a fragmentary sectional view of a portion of FIG. 3;
FIG. 5 is a view taken along line 5—5 of FIG. 2;
FIG. 6 is a top plan sectional view of the invention device taken along the line 6—6 of FIG. 2; and
FIG. 7 is a view illustrating the employment of the invention gauge to measure the depth of a hole in a tooth.

DESCRIPTION OF THE PREFERRED EMBODIMENTS

Referring now to the figures of the drawing, the dental gauge 10 comprises an elongated cubic body 12 preferably tapered at one end 14 thereof. While body 12 is described as cubic, it is also to be understood that it could be cylindrical, as well, this feature not being critical to the invention. Body 12 is preferably made of a suitable hard plastic material, although a suitable surgical metal (e.g. surgical steel) could also be used. Embedded lengthwise in body 12 is a minor portion 16 of a tubular metal 18. The major portion 20 of said tubular metal 18 extends externally of, and in the same horizontal plane as, body 12 and finally curving downwardly at its external end 22. Tubular metal 18 partially sheaths a probing member 30, comprising a metal wire slidingly contained within said tubular metal 18 (FIGS. 1 and 2). Probing member 30 being resultingly guided by tubular member 18 is similarly curved at its probing end 32. As indicated, the probing member 30 comprising a metal wire is sized so as to be slidingly contained within tubular member 18 (FIG. 5).

A graduated measuring scale 40, whose function will be subsequently described, is located on an outer face 42 of body 12. Scale 40 can be graduated in millimeters or tenths of millimeters depending on the desired accuracy as will be seen, or in whatever scale suitable.

A sliding member 44, of hollow cubic shape, preferably plastic, is slidingly fitted over body 12 and is positioned to slide over scale 40, for a reason to be shown hereinbelow.

Probing member 30 is slidingly actuated within tubular member 18 by means of its securement to guide pin portion 50 (FIG. 6), which guide pin 50 is formed by bending a portion of member 30, so that it is disposed at right angles to said member 30. Guide pin 50 is embedded or secured to a wall 45 of sliding member 44 directly opposite to it (FIG. 3). Guide pin 50 in turn slides within a guide channel 52, provided for that purpose, in a wall 54 adjacent to face 42, and also in another guide channel 53 associatingly provided in tubular metal 18. Thus it can be seen by looking at FIGS. 1 and 6, particularly, that the movement of sliding member 44 in the direction of the arrows shown therein, will result in the movement forward of member 30, and in the exposure of its probing end 32, in the downward direction of the arrow shown (FIG. 6). Conversely, sliding the member 44 rearwardly as shown by the arrows, will result in the retraction of probing end 32 back into tubular metal 18 (and curved end 22 thereof). Guide channel 52, 53 serve not only to guide pin 50 but also to hold member 30 in a firm, substantially non-rotating position.

When it is desirous to measure the depth of a hole 60, provided in a tooth 62, as illustrated in FIG. 7, what is done is to rest the curved end 22 of tubular metal 18 over the hole in the tooth, with probing member 30 fully retracted inside tubular metal 18, sliding member 44 is actuated forward thereby also resultingly sliding probing member 30 forward and its probing end 32 downwardly into the hole in the tooth until the probe tip 33 of end 32 with proceed no further, i.e. "hits bottom." As will be recalled, the sliding member 44 having been positioned over graduated scale 40, the distance that the sliding member 44 travels will be the depth $x$ of hole 60, and the distance will be readily ascertained by reading it on the graduated scale 40 provided for that purpose.

It can be seen that the instant device will have ready applicability wherever it is desired to measure any inaccessible dimension in the mouth, or otherwise, such as the depth of the hole in a tooth or a splnit and the like, merely to name a few applications. It can also be seen that the accuracy of the measurement can be set, as desired, merely by providing further sub-graduations, e.g. tenths, hundredths, etc. It can also be further seen that a highly accurate dental gauge has been provided which is not only extremely simple in its construction, but also simple in its employment.

Having thus described the fundamental novel features of the invention, as applied to a specific embodiment, it is to be understood that various changes may be made in the form of the device illustrated by those skilled in the art without departing from the spirit and scope thereof.

What is claimed is:

1. A dental gauge for measuring the depth of a generally elongated body member within which is contained at least part of a tubular member, said tubular member, in turn, at least partially sheathing a probing member slidingly contained therein, said probing member being adapted to simultaneously measure a dimension and convey the resultant measurement obtained, wherein said body member is provided thereon with a graduated linear measuring scale, a sliding member having a hollow cubic shape and being slidably fitted over said body member and positioned to slide over said measuring scale, said probing member being secured to said sliding member whereby the dimension measured by said probing member is directly viewable on said measuring scale, a minor portion of said tubular member being contained within said body member, a major portion being provided externally thereof, said major portion terminating in a curved end, a guide channel being associatingly provided in said body member and said minor portion, respectively, a guide pin securing said probing member to said sliding member, said guide pin being movable within said guide channel, said guide pin being formed integrally with said probing member and disposed at a right angle with respect thereto, the movement forward of said sliding member resultingly moving said probing member forward, the forward end of said probing member terminating in a probing tip which senses the dimension to be measured and the distance traveled by said sliding member constituting the linear measurement of the depth of said hole.

References Cited

UNITED STATES PATENTS

| | | | |
|---|---|---|---|
| 1,327,114 | 1/1920 | Rhein | 33—169 |
| 1,501,170 | 7/1924 | Korb | 33—169 |
| 3,058,225 | 10/1962 | Ward | 33—172 |

LEONARD FORMAN, Primary Examiner

C. E. PHILLIPS, Assistant Examiner